United States Patent
Wymore

(10) Patent No.: US 10,046,721 B2
(45) Date of Patent: Aug. 14, 2018

(54) VEHICLE SPORT BAR WITH REMOVABLE DECORATIVE PANELS

(71) Applicant: Iddea California, LLC, Brea, CA (US)

(72) Inventor: Timothy J. Wymore, Yorba Linda, CA (US)

(73) Assignee: Iddea California, LLC, Brea, CA (US)

( * ) Notice: Subject to any disclaimer, the term of this patent is extended or adjusted under 35 U.S.C. 154(b) by 0 days.

(21) Appl. No.: 15/266,106

(22) Filed: Sep. 15, 2016

(65) Prior Publication Data

US 2018/0072244 A1 Mar. 15, 2018

(51) Int. Cl.
*B60R 13/04* (2006.01)
*B60R 21/13* (2006.01)
*B60Q 1/02* (2006.01)

(52) U.S. Cl.
CPC ............. *B60R 13/04* (2013.01); *B60R 21/13* (2013.01); *B60Q 1/02* (2013.01)

(58) Field of Classification Search
CPC ............ B60R 21/13; B60R 13/04; F16B 5/12
USPC .......................... D12/406, 222, 414.1; 296/3
See application file for complete search history.

(56) References Cited

U.S. PATENT DOCUMENTS

| | | | |
|---|---|---|---|
| D244,268 S | 5/1977 | Hinch | |
| 4,152,020 A | 5/1979 | Brown et al. | |
| D253,170 S | 10/1979 | Ramirez | |
| 4,211,448 A | 7/1980 | Weston | |
| D257,673 S * | 12/1980 | Milton | D12/222 |
| 4,267,948 A | 5/1981 | Lewis | |
| 4,269,339 A * | 5/1981 | Bott | B60Q 1/2661 224/309 |
| 4,278,175 A | 7/1981 | Jackson | |
| 4,426,028 A * | 1/1984 | Bott | B60Q 1/2661 224/325 |
| 4,534,496 A * | 8/1985 | Bott | B60Q 1/2661 224/321 |
| 4,659,131 A | 4/1987 | Flournoy | |
| D295,084 S | 4/1988 | Weber | |
| 4,854,628 A | 8/1989 | Halberg | |
| D305,111 S | 12/1989 | Zagner | |
| D306,848 S | 3/1990 | Macor | |
| 5,002,324 A | 3/1991 | Griffin | |
| D316,391 S | 4/1991 | Lund | |
| D318,447 S | 7/1991 | Haugen et al. | |

(Continued)

FOREIGN PATENT DOCUMENTS

BR 202012008884 * 11/2013 ............. B60R 21/13
DE 20120319 U1 * 4/2002 ............. B60R 13/04

(Continued)

*Primary Examiner* — Hilary L Gutman
(74) *Attorney, Agent, or Firm* — Stetina Brunda Garred and Brucker

(57) ABSTRACT

A sport bar for a motor vehicle has front and rear mounting tubes inclined relative to each other. A removable side panel fits between the mounting tubes. The panel is fastened to a mounting frame having a periphery from which extend a plurality of mounting plates inclined to one side of the mounting panel flange. A periphery of the mounting plates are connected to the mounting tubes on an inner side of a plane through the mounting tubes, with the inclined mounting plates positioning the side panel adjacent a plane along the outer periphery of the mounting tubes. Threaded fasteners allow replacement of the side panel while the bracket remains.

13 Claims, 5 Drawing Sheets

(56) References Cited

U.S. PATENT DOCUMENTS

| | | | |
|---|---|---|---|
| 5,037,152 | A | 8/1991 | Hendricks |
| 5,061,000 | A | 10/1991 | Haugen et al. |
| 5,143,415 | A | 9/1992 | Boudah |
| 5,152,570 | A | 10/1992 | Hood |
| 5,192,107 | A | 3/1993 | Smith |
| 5,303,858 | A | 4/1994 | Price |
| 5,316,190 | A | 5/1994 | Bullock |
| D360,614 | S | 7/1995 | Alcocer |
| D363,460 | S | 10/1995 | Marshall |
| 5,476,301 | A | 12/1995 | Berkich |
| 5,492,259 | A | 2/1996 | Tippets |
| D367,843 | S | 3/1996 | Tayar |
| 5,560,666 | A | 10/1996 | Vieira et al. |
| 5,692,791 | A | 12/1997 | Sulzer |
| D394,639 | S | 5/1998 | Carter |
| 5,752,734 | A | 5/1998 | Ward et al. |
| 5,806,905 | A | 9/1998 | Moore |
| D399,476 | S | 10/1998 | Duncan |
| 5,836,635 | A | 11/1998 | Dorman |
| D436,915 | S | 1/2001 | Burger |
| D444,446 | S | 7/2001 | Carter |
| 6,367,673 | B1 | 4/2002 | Smith et al. |
| 6,394,524 | B1 | 5/2002 | Morse |
| D463,358 | S | 9/2002 | Thomas |
| D467,862 | S | 12/2002 | Jenkins |
| 6,513,849 | B2 | 2/2003 | Carter |
| 6,520,723 | B2 | 2/2003 | Christensen |
| D493,414 | S | 7/2004 | Condos |
| D494,921 | S | 8/2004 | Taylor |
| 6,883,848 | B1 | 4/2005 | Iverson et al. |
| 6,983,968 | B2 | 1/2006 | Brauer et al. |
| 6,983,977 | B1 | 1/2006 | Kozak et al. |
| D515,495 | S | 2/2006 | Storer |
| D528,964 | S * | 9/2006 | Storer .................. D12/222 |
| D528,968 | S * | 9/2006 | Storer .................. D12/222 |
| 7,172,322 | B2 * | 2/2007 | Pommeret .................. B60J 1/00 362/267 |
| 2003/0070390 | A1 * | 4/2003 | Dunn ...................... B60R 13/04 52/716.7 |
| 2013/0020822 | A1 * | 1/2013 | Inoue ...................... B62D 35/007 296/1.08 |
| 2014/0125044 | A1 * | 5/2014 | Mantovani ............. B60R 21/13 280/756 |
| 2015/0258876 | A1 * | 9/2015 | Kondo .................... B60R 13/04 296/146.15 |
| 2016/0221421 | A1 * | 8/2016 | Makita ................... B60R 13/04 |

FOREIGN PATENT DOCUMENTS

| | | | | |
|---|---|---|---|---|
| FR | 3033738 | A1 * | 9/2016 | ............. B60J 1/007 |
| JP | WO 2013125015 | A1 * | 8/2013 | ............. B60R 13/04 |
| JP | 2014189235 | A * | 10/2014 | ........... B60J 10/085 |
| JP | 2015048002 | A * | 3/2015 | ............. B60J 5/0411 |
| JP | 2015058761 | A * | 3/2015 | ............. B60R 13/04 |
| WO | WO 2013155576 | A1 * | 10/2013 | ............. B60R 21/13 |

\* cited by examiner

VEHICLE SPORT BAR WITH REMOVABLE DECORATIVE PANELS

The present invention relates generally to a sport bar used on motor vehicles, typically trucks. In order to enhance night visibility, supplemental lights may be mounted to a sport bar located to position the lights above the cab of a truck with the lights located and orientated to supplement the vehicle lighting. The sport bar typically mounts to the top rail of a pickup-truck box at the rear of the cab with the sport bar located at the roof of the vehicle, at a height above the head of the seated driver and seated passengers. A plurality of lights are mounted to the bar, with the lights shining forward, over the top of the cab to supplement the truck's lights. The sport bar may have no lights and may act as a roll bar.

The sport bars may have an inverted "V" shaped connection to the top rail of the truck box formed by two tubes, with one generally vertical mounting tube and one inclined mounting tube. The space between the mounting tubes is open, allowing visibility between the mounting tubes, allowing passage of debris between the mounting tubes and into the truck bed, allowing passage of items in the bed out of the bed and between the mounting tubes, with the open space further causing wind noise. There is thus a need for closing up or blocking the open space between these mounting tubes. There is a further need for blocking the open space between the mounting tubes in an aesthetically pleasing manner. Because different persons may view the appearance differently, there is a still further need for changing the appearance of whatever is used to block the open space between the mounting tubes.

BRIEF SUMMARY

A sport bar for a motor vehicle has front and rear mounting tubes inclined relative to each other. A removable side panel fits between the mounting tubes. The panel is fastened to a mounting frame having a periphery from which extend a plurality of mounting plates inclined to one side of the mounting panel flange. A periphery of the mounting plates are connected to the mounting tubes on an inner side of a plane through the mounting tubes, with the inclined mounting plates positioning the side panel adjacent a plane along the outer periphery of the mounting tubes. Threaded fasteners allow replacement of the side panel while the bracket remains. Thus. a removable panel is fastened to a mounting frame which in turn is fastened to the two mounting tubes, with the panel removably fastened to the mounting frame by threaded fasteners such as bolts, allowing a secure connection of the panel to the mounting frame while allowing the panel to be removed and replaced as desired.

In more detail a sport bar for a motor vehicle has a generally vertical front mounting tube and a rear mounting tube inclined in a downward and rearward direction relative to the front mounting tube. The mounting tubes are connected by a mounting base configured to fasten to the upper rail of the bed of a pickup truck. A removable side panel is sized to fit between the front and rear mounting tubes. The side panel has a peripheral shape with a planar mounting surface and a first plurality of holes through the side panel. A mounting frame is provided having a mounting panel flange with a planar surface configured to mate with the peripheral shape of the side panel. The mounting frame has a second plurality of holes located to correspond with the first plurality of holes through the side panel. The mounting frame also has a periphery from which extend a plurality of mounting plates inclined to one side of the mounting panel flange. A plurality of the mounting plates has a side that is connected to a side of another mounting plate. The plurality of mounting plates have a third plurality of holes at a periphery of the mounting plates and that third plurality of holes is located to coincide with a mating fourth plurality of holes on the mounting tube. A plurality of fasteners extends through the first plurality of holes in the side panel and the second plurality of holes in the mounting panel flange to releasably fasten the side panel to the mounting frame. A second plurality of fasteners extends through the third plurality of holes in the mounting plates and fourth plurality of holes in the mounting tubes to fasten the mounting frame to the mounting tubes.

In further variations, the sport bar includes a bracket connected to one of the sport bars and further connected to the mounting tube. The bracket may comprises a plate having one end fastened by a fastener to the rear mounting tube and another end fastened by a fastener to one of the mounting plates. The side panel advantageously has a peripheral flange through which the first plurality of holes each extends. The mounting plates are inclined such that the when the mounting tubes have a diameter D, then the plates are a distance of about D/2 from a plane through the centerlines of the mounting tubes. The exterior surface of that side plate could be a little beyond or inside of that distance.

In preferred variations, the side panel has a straight bottom side and a straight front side, with a third side joining the bottom side and front side. The third side may have two inclined segments and an intervening horizontal segment. The side panel may also be configured so that the mounting plates include a bottom plate that extends along the straight bottom side and is longer than it is wide and not fastened to the mounting tubes. The mounting plates may include a front plate having an inclined bottom portion connected to one end of the bottom plate, and the front plate may have a generally rectangular shape. The 6 mounting plates may also include a first inclined plate extending along the first inclined segment, with a triangular plate having one side joined to a top of the front plate and a second side joined to a top of the first inclined plate.

The front and rear sport bars extend on each opposing side of the motor vehicle during use, and there is a mounting frame and removable side panel on each side of the sport bars and vehicle during use. . The side panels and mounting frame are preferably fastened to the mounting tubes by threaded fasteners.

There is also advantageously provided a method for attaching a side panel to a sport bar of a motor vehicle, where the sport bar has a generally vertical front mounting tube and a rear mounting tube inclined in a downward and rearward direction relative to the front mounting tube/The mounting tubes are preferably connected by a mounting base configured to fasten to the upper rail of the bed of a pickup truck. The method includes the steps of removably fastening a side panel to a mounting frame where the side panel is sized to fit between the front and rear mounting tubes. The side panel also has a peripheral shape with a planar mounting surface and a first plurality of holes through the side panel. The method further includes aligning the first plurality of holes with a second plurality of holes in a planar flange of a mounting frame and placing different ones of a first plurality of fasteners through those aligned holes to connect the side panel to the mounting planar flange and mounting frame. The mounting frame advantageously has a plurality of mounting plates extending from a periphery of the planar flange to one side of the planar flange. The method then aligns a third plurality holes in a periphery of the mounting plates with a fourth plurality of holes in the front and rear mounting tubes and places different ones of a second plurality of fasteners through those aligned holes to connect the mounting plates to the mounting tubes. The front and rear mounting tubes have centerlines in the same plane with the side panel being located on an outer side of that plane and with the fourth plurality of holes in the mounting tubes being located on an inner side of that plane.

In further variations, the mounting tubes have a diameter D and the front surface of the side panel is located a distance of about D/2 from the plane. Further, the side panel may have a peripheral flange through which the first plurality of holes extends. The side panel preferably has a straight bottom side, a straight front side, and a third side joining the bottom side and front side. The third side has two inclined segments and a horizontal segment there between. The mounting plates include a bottom plate that extends along the straight bottom side and is longer than it is wide and not connected to the mounting tubes. The mounting plates may further include a front plate having an inclined bottom portion connected to one end of the bottom plate. The front plate may have a rectangular shape with an outer periphery fastened to the front tube by the step of placing the first plurality of fasteners to connect the mounting plates to the mounting tubes. Advantageously, the mounting plates further include a first inclined plate extending along the first inclined segment, with a triangular plate having one side joined to a top of the front plate and a second side joined to a top of the first inclined plate, with the step of placing the second plurality of fasteners resulting in fastening the first inclined plate to the second mounting tube. The method may also include an offset bracket, with the step of placing the first plurality of fasteners further including fastening the mounting frame to the corner bracket and to the rear mounting tube.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

Figure 1:
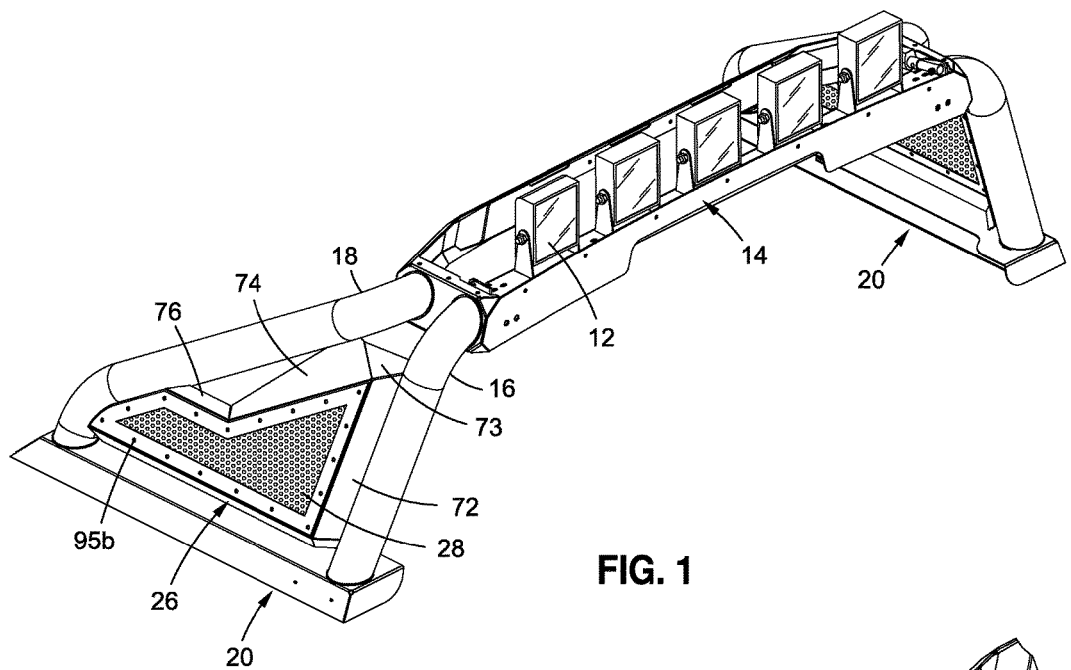
FIG. 1 is a perspective view of a sport bar with two mounting tubes and a mounting frame connected to those mounting tubes and with a removable panel connected to the mounting frame.
Figure 2:
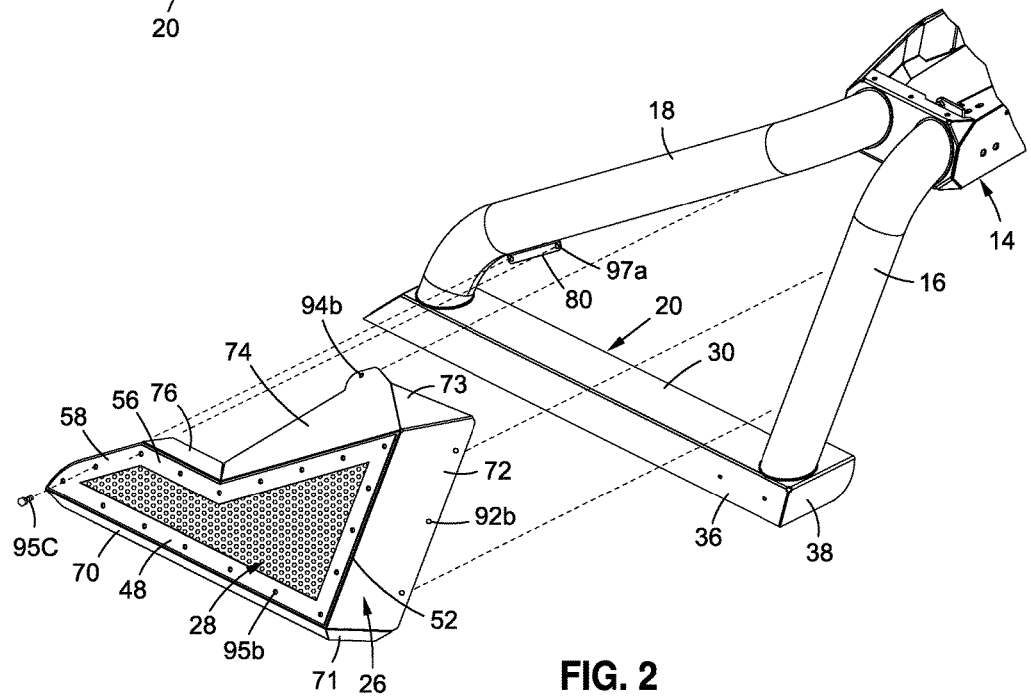
FIG. 2 is an exploded perspective view of one side of the mounting frame and panel of FIG. 1, with the opposing side being a mirror image thereof.
Figure 3:
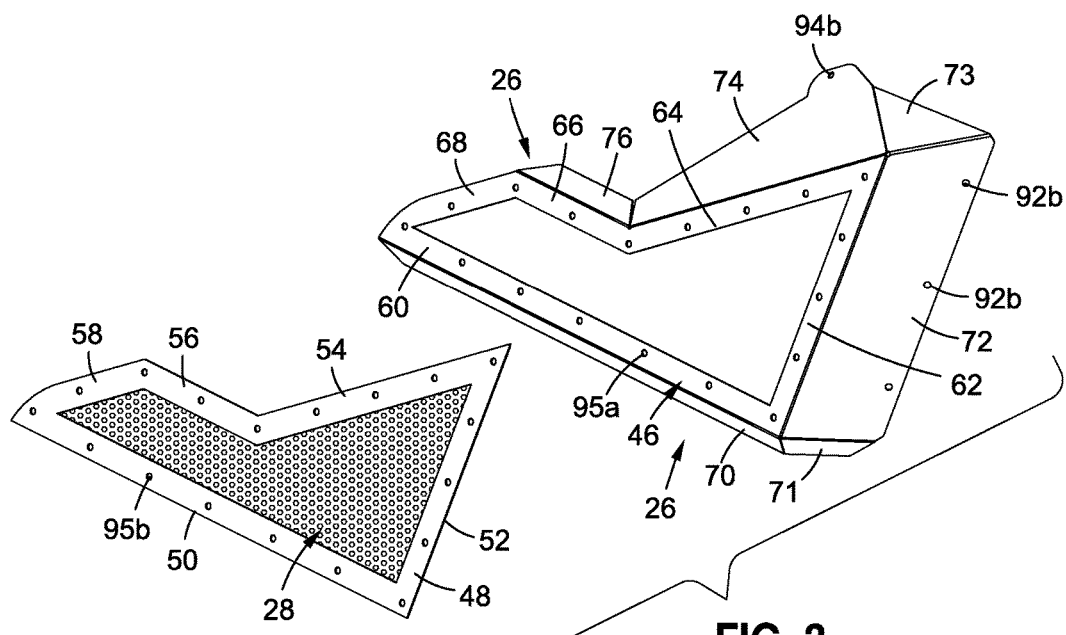
FIG. 3 is an exploded view of the mounting frame and removable panel of FIGS. 1 and 2.
Figure 4:
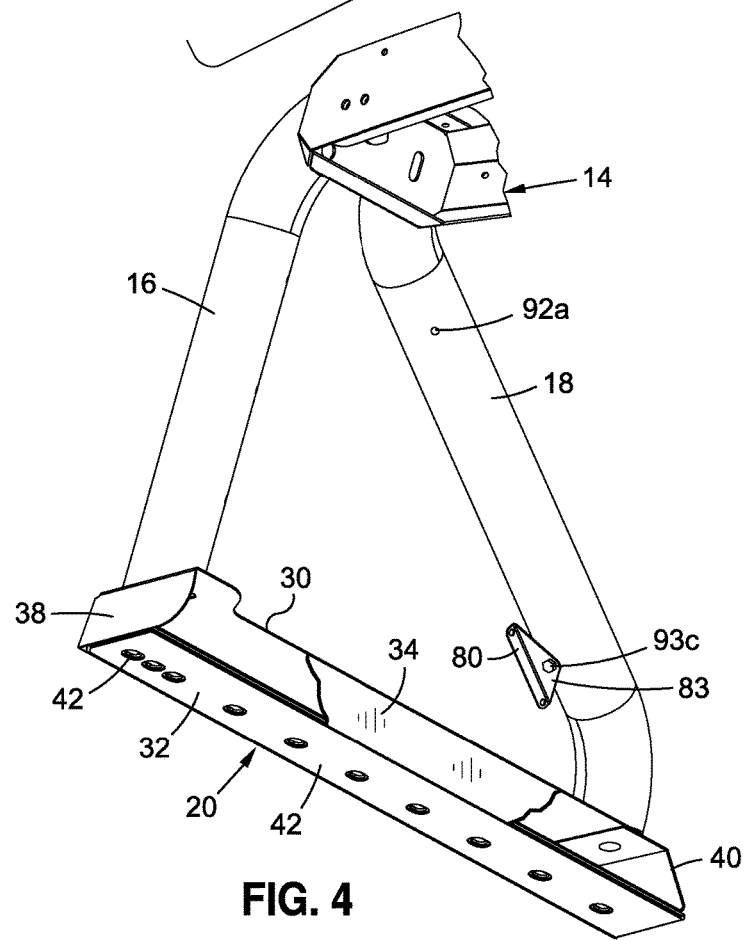
FIG. 4 is a perspective view of the mounting tubes of FIG. 1 from the inside of a pickup box looking upward and outward.
Figure 5:
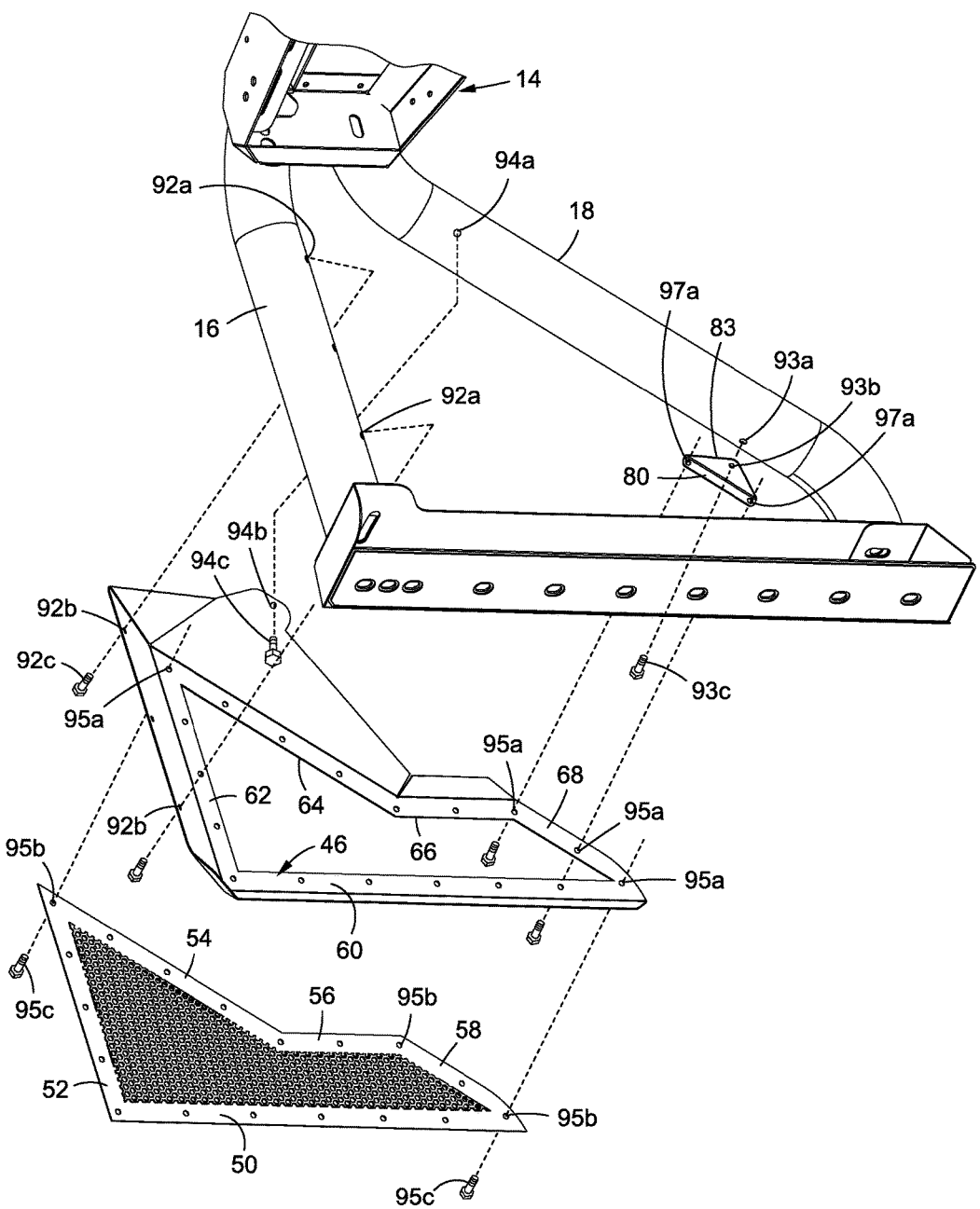
FIG. 5 is an exploded view of the mounting tubes of FIG. 4, mounting frame and panel.

As used herein the various part numbers are as follows 10—sport bar; 12—lights; 14—top frame; 16—front mounting tube; 18—rear mounting tube; 20—mounting base; 22—upper rail of box; 26—mounting frame; 28—side panel; 30—top of mounting base 20; 32—bottom of mounting base 20; 34—inner side of mounting base 20; 36—outer side of mounting base 20; 38—front end of mounting base 20; 40—rear end of mounting base 20; 46—mounting panel flange; 48—panel frame; 50—horizontal bottom side; 52—generally vertical front side; 54—first inclined segment; 56—horizontal segment; 58—second inclined segment 60—bottom flange segment; 62—generally vertical front flange segment; 64—first inclined flange segment; 66—middle horizontal flange segment; 68—second inclined flange segment; 70—first bottom plate; 71—first corner plate; 72—first generally vertical front plate; 73—second corner plate; 74—first inclined plate 74; 76—middle plate; 78—connector tab 78; 80—connector flange; 83—mounting bracket; 92a—fastener holes in tube; 92b—fastener holes in plate 70; 93c—fastener; 93a—fastener hole in tube; 93b—fastener hole in bracket 83; 93c—fastener.

Figure 6:
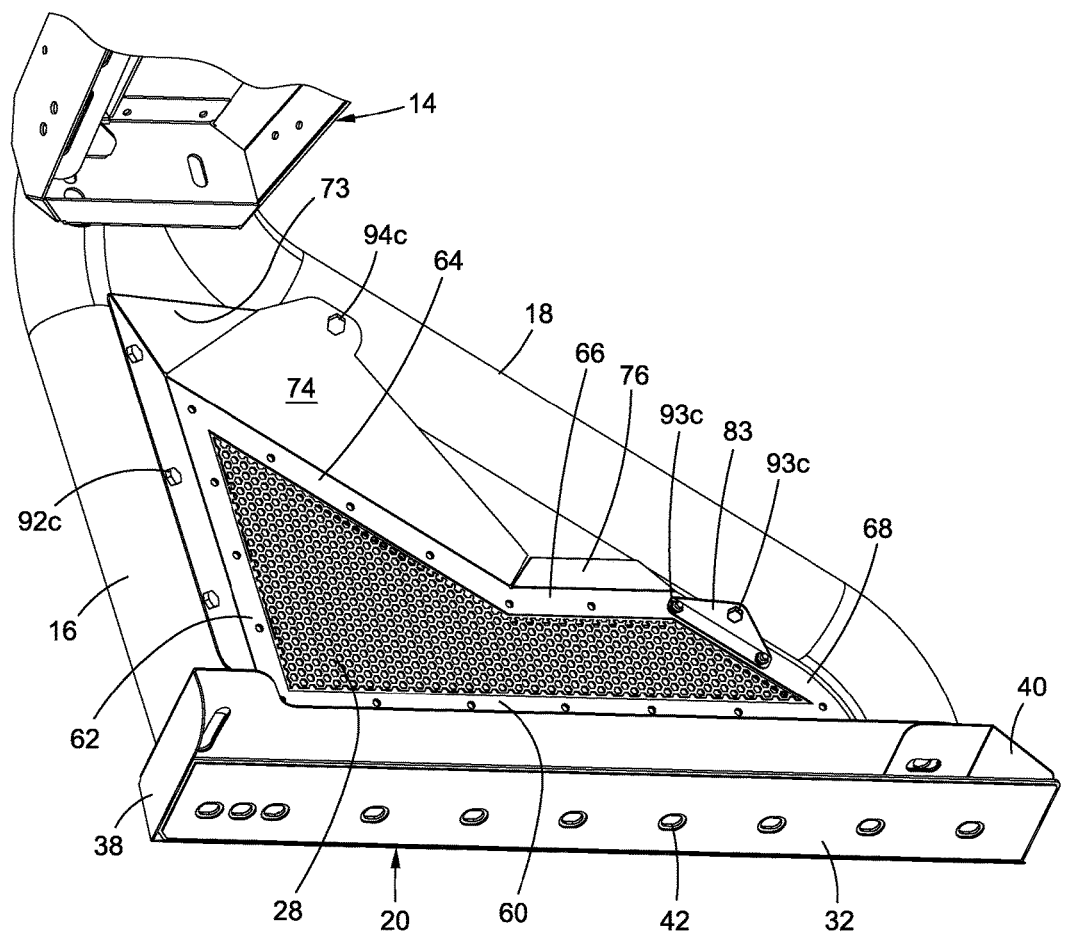
FIG. 6 is an assembled view of FIG. 5.

Referring to FIGS. 1-7, the sport bar 10 is shown as comprising a light bar with lights 12 connected to a frame 14 extending between and connected to the upper ends of front and rear mounting tubes 16, 18. The bottom end of each mounting tube 16, 18 connects to a mounting base 20 configured to be fastened to the upper rail 22 (FIG. 7) of a pickup box FIGS. 1, 6). A mounting frame 26 is fastened to the mounting tubes 16, 18 and a side panel 28 is connected to the mounting frame. connected to the As used herein, the relative terms up and down, upper and lower, top and bottom, refer to the directions relative to ground and the direction of gravity, as best seen in FIG. 6. The relative terms front and back, forward and rearward are with respect to the relative positons on a vehicle as illustrated in FIG. 6.

The top frame 14 is shown as a rectangular frame with front and back sides each connected to an end panel on each opposing end of the frame. The upper end of the mounting tubes 16, 18 on a first side of the vehicle connect to one end panel while the upper end of the mounting tubes 16, 18 on the opposing, second side of the vehicle connect to the other end panel to support the top frame 14 and connect it to the vehicle. The frame 14 is typically of a welded metal construction, a bent metal construction, or bent and welded metal construction. The tubes 16, 18 are typically welded to the frame 14.

The front mounting tube 16 is generally vertical and configured to fit alongside the rear of a pickup cab, preferably abutting the back of that cab or parallel to the outer edges of the cab at the rear of the cab. The rear mounting tube 18 is inclined rearward so the distance between the lower ends of the mounting tubes 16, 18 is greater than the distance between the upper ends of those legs. When viewed from the side, the rear mounting tube 18 advantageously depends downward at an angle of about 20-40° from the vertical. The upper ends of the mounting tubes 16, 18 are spaced a few inches apart but the distance will vary with the sport bar 10. The upper ends of the mounting tubes 16, 18 are curved to extend generally horizontal as the top frame 14 is generally horizontal and the end panels of that frame are generally vertical. The majority of the length of each mounting tube 16, 18 is straight, with the lower end of the rear mounting tube 18 is also curved downward to form a vertical connection with the generally horizontal mounting base 20. The lower end of the front mounting tube 16 is generally vertical to the mounting base 20. The lower end of the rear mounting tube 18 extends generally vertically from the mounting base 20 before being inclined along the straight length of the inclined rear tube 16. The rear mounting tube 18 extends downward and rearward from adjacent the top end of the front mounting tube 16.

The mounting base 20 may comprise an open box that fits over opposing sides of the upper rail 22 (FIG. 7) of the pickup truck, but preferably comprises a closed box having an opposing top and bottom 30, 32, with opposing inner and outer sides 34, 36 and opposing front and rear ends 38, 40. As used herein, the relative terms inner and outer refer to a direction generally toward a longitudinal axis of the pickup truck, or away from that axis. If the rear end 40 and optionally the inner side 34 are omitted, the mounting base forms an open box that may place the outer side 36 against the outer side of the box on the pickup truck, with top 30 abutting the upper rail 22 of the pickup truck's box, and the front end 38 fitting over the front corner of the box. The optional inner side 34 may face the inner side of the truck's upper rail. Preferably though, the mounting base 20 forms a closed box for increased strength, with the top and bottom 30, 32 connected to the inner and outer sides 34, 36 and front and rear ends 38, 40, by welding, spot welding, riveting, or bending of parts to form the closed box. The top 30 may be welded, bolted or otherwise connected to the lower ends of the mounting tubes 16, 18. The bottom 32 may have a plurality of holes 42 at predetermined locations or uniform spacing to allow the bottom (and base 20) to be fastened to the upper rail 22 of the box of the pickup truck. The inner side 34 may have openings to allow access to the inside of the mounting base 20 to make it easier to connect the mounting base 20 to the upper rail 22 of the pickup box. The inner side 34 may be omitted, but that makes the mounting base 20 less strong and is not as preferred. The inner side 38 is removed for clarity on FIGS. 5-6.

The two mounting tubes 16, 18 and the mounting base 20 form a trapezoidal shape as the upper ends of the tubes 16, 18 are spaced horizontally apart to form the short leg of the trapezoid. The mounting tubes 16, 18 are preferably cylindrical tubes but other cross-sectional shapes may be used, including rectangular (which includes square). The tubes 16, 18 and base 20 are preferably of sturdy, metal construction.

Figure 8:
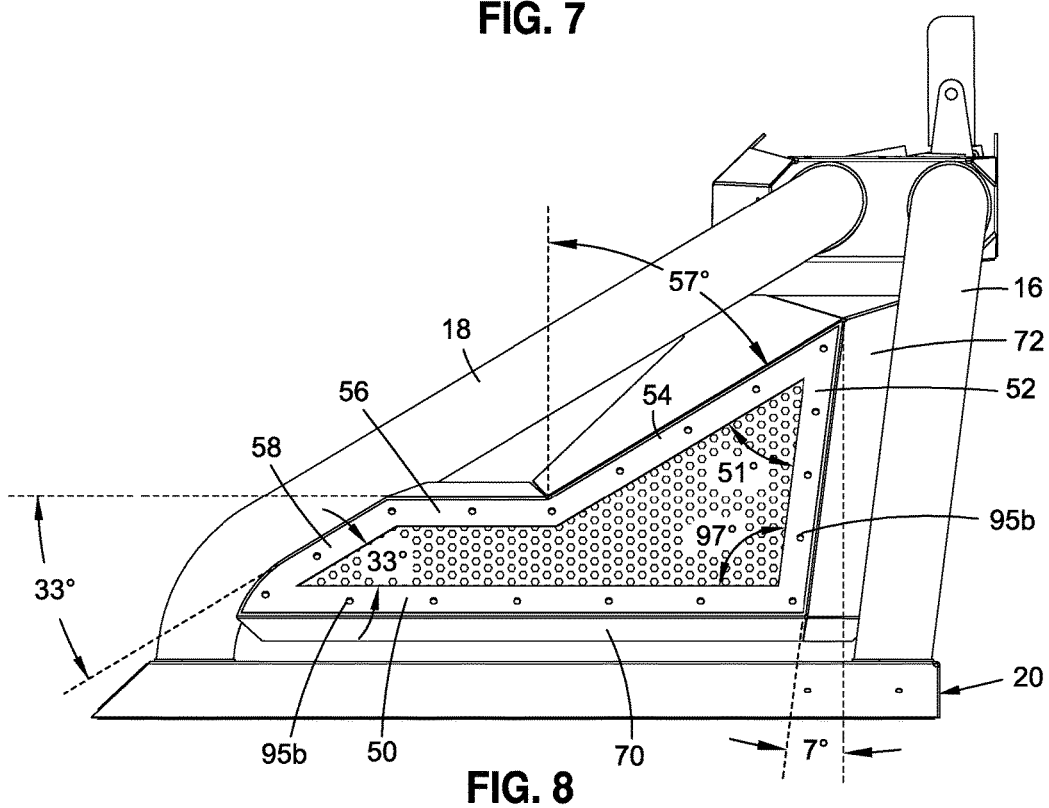
FIG. 8 is a side view of the sport bar of FIG. 1.

The mounting frame 26 is preferably connected to these mounting tubes 16, 18, and the panel 28 is preferably connected to the mounting frame 26, by threaded fasteners such as screws or bolts (not shown). Mounting frame 26 advantageously has a mounting flange 46 configured to mate with a panel frame 48 of the panel 28. The panel frame 48 may form an outer periphery of the panel 28, or panel frame 48 may be a separate part to which the panel 28 is fastened, as discussed later. In the depicted embodiment the panel 28 has a multi-lateral periphery that includes horizontal bottom side 50 and a generally vertical front side 52 which is preferably parallel to but offset from the front mounting tube 16 (FIG. 8). The top of the front side 52 is joined to the rear of the bottom side 50 by a periphery having first and second, inclined end segments 54, 58 joining a horizontal middle segment 56. The inclined segments 54, 58 may have the same inclination of about 30° relative to the horizontal, but need no do so. The periphery of the panel 28 and its frame 48, in a counterclockwise listing, include bottom 40, vertical front side 52, first inclined segment 54, middle horizontal segment 56, and second inclined segment 58. The segments 54, 58 are downwardly inclined toward bottom side 50, with middle segment 56 being parallel to bottom 50. The specific angles are shown in FIG. 9, recognizing that the dimensions are approximate. As used herein, the reference to "about" vertical, "about" horizontal, or "about" a specific angle should allow a variance of 10 degrees on either side of the angle. As used herein, a reference to generally vertical or generally horizontal also includes a variance of 10 degrees on either side of vertical or horizontal.

The flange 46 of the mounting frame 26 advantageously has a shape corresponding to that of the periphery of panel 28 and its panel frame 48. Thus, the flange 46 has a horizontal bottom flange 60, a vertical front flange 62, a first downwardly inclined segment 64, a middle horizontal segment 66 and a second downwardly inclined segment 68, corresponding to peripheral segments 50, 52, 54, 56 and 58, respectively of the panel 28. During use, segments 50, 52, 54, 56 and 58 of the panel frame 48 of panel 28 are fastened directly to the corresponding segments 60, 62, 64, 66 and 68 of flange 46 of mounting frame 26.

The mounting frame advantageously positions the preferably planar panel 28 relative to the mounting tubes 16, 18, preferably so the front surface of the side panel 28 lies in a plane with a line extending between the laterally outer surfaces of the tubes, or a tangent between those tubes 16, 18. If the mounting tubes 16, 18 have a diameter D, this plane is about D/2 from the plant through the centerline of the tubes 16, 18. The panel 28 may be a little bit outward or inward of that plane, preferably within an inch or two. To achieve this positioning, a connecting plate preferably extends from each of a plurality of the outer peripheral segments 60, 62, 64, 66 and 68 of the flange 46, with the plate inclined at an angle from the flange 46 selected to achieve the desired positioning. The plate thus include bottom plate 70 extending at an angle from the lower edge of bottom flange 60, toward the inside of the box of the pickup truck. As seen in FIG. 8, the bottom edge of bottom plate 70 is preferably spaced above the upper surface of the mounting base 20. A first vertical front plate 72 extends at an inward angle from the front edge of the vertical front flange segment 62. A first corner plate 71 advantageously joins the front side of the bottom plate 70 and the lower side of the front flange plate panel 72. A first inclined plate 74 extends at an angle inward and upward from the first inclined flange segment 74. A second corner plate 73 advantageously joins the upper side of the front plate 72 to the front side of the first inclined plate 74. A middle plate extends inward and upward from the upper edge of the middle horizontal flange segment. Advantageously, a front end of the middle plate 76 connects to the rear end of the first inclined plate 74. A connector tab 78 connects to the second inclined flange segment 68. The connector tab 78 has a connector flange 80 (FIGS. 4-6) perpendicular to the second inclined flange segment 68 extending at an angle from a triangular mounting bracket 83. The mounting bracket 83 is preferably at an angle to the flange 80 which is preferably parallel to and abutting flange segment 68 during use. The flange 80 forms part of the bracket 83.

All of the plates 70, 72, 73, 74 and 76 are trapezoidal in shape, with corner panel 73 being triangular in shape. The plates 70, 72, 74, 76 and mounting bracket 83. The mounting tubes 16, 18 have a plurality of fastener holes 92a and 94a located to coincide with corresponding fastener holes 92b and 94b through each of the plate 72 and 74, respectively, to receive threaded fasteners 92c, 94c to fasten those parts together. Similar corresponding fastener holes may optionally be located in base 20 and bottom plate 70 to accommodate a fastener, none of which are illustrated. Corresponding fastener hole(s) 93a and 93b in mounting tube 18 and connector bracket 83 receive threaded fastener(s) 93c to fasten those parts together. A plurality of fastener holes 95a extend through the flange 46 located to correspond with holes 95b through the panel frame 48 so that fasteners 95c may fasten the panel 28 to the mounting frame 46. One or more fastener holes 97a are formed in flange 80 of bracket 83 to align with holes 95a in flange 46 and in particular in the second inclined segment 68, so as to fasten the side panel 28 to the frame 46 and flange 80 and connector 83 and mounting tube 18. Thus, the side panel 28 is connected to the tubes 16, 18 through the mounting frame 26 and the connector bracket 83.

A plurality of fasteners 95c pass through holes 95b in the side panel frame 48 to fasten the side panel 28 to the frame 48. The mounting plates or support plate 70, 71, 72, 73, 74 and 76 along with bracket 83, and especially the angle of the mounting plate relative to the mounting panel flange 46, position the side panel 28 relative to the support tubes 16, 18 to which the mounting plates are fastened. The mounting plates fasten to inner portions of the mounting tubes 16, 18 and preferably fasten to those tubes at a location inside of a vertical plane through the centerline of the tubes 16, 18. Advantageously, the frame 46 and with its mountingplates 70-75 and 76 is inserted from the inside of the mounting tubes 16, 18 toward the outside of the tubes and truck, and fastened in place from the inside of the tubes. This location allows the fasteners 93c, 95c to be generally shielded from accidental contact with persons grabbing the tubes 16, 18, with the side panel 28, mounting panel frame 46, mounting plates 70, 71, 72, 73, 74 and 76 cooperating to limit access from outside the vehicle to the fasteners and connections with the mounting tubes. That helps avoid inadvertent contact with the fastener heads as may injure fingers or snag clothing. It also shields view of the fasteners from outside the vehicle to present a more attractive side panel 28.

The mounting plate 70-74 and 76 are preferably contiguous and may be formed by bending and then welding or riveting metal to form the depicted parts. The use of support inclined to the plane of frame 46 and panel 28 strengthen the support of the frame and panel. The joining of the mounting plate edges at angles to each other further strengthen the plate and further strengthen the support of the frame 46 and panel 28.

In the depicted embodiment the mounting plates 70-74 and 76 offset the side panel 28 slightly to the rear of front mounting tube 16, and slightly below inclined, rear mounting tube 18, with the inclined mounting plate also providing an apparent depth separation along the lateral or horizontal axis toward the inside of the vehicle. The visual result is believed to be attractive, while providing a sturdy support for the side panel 28. As seen in FIG. 8, the side panel's front vertical side 52 is preferably parallel to the front mounting tube 16, but offset therefrom by the inwardly inclined vertical front panel 62 which is connected to that mounting tube. The side panel's bottom side 50 is parallel to but offset from the mounting base 20 by the inwardly inclined bottom plate 70, which is spaced apart from the mounting base 20. The panel's first and second downwardly inclined segments 54, 58 are preferably parallel to the second mounting tube 18, with the second segment 58 abutting or immediately adjacent that tube and the first segment 54 offset by the inwardly extending inclined plate 74

Figure 7:
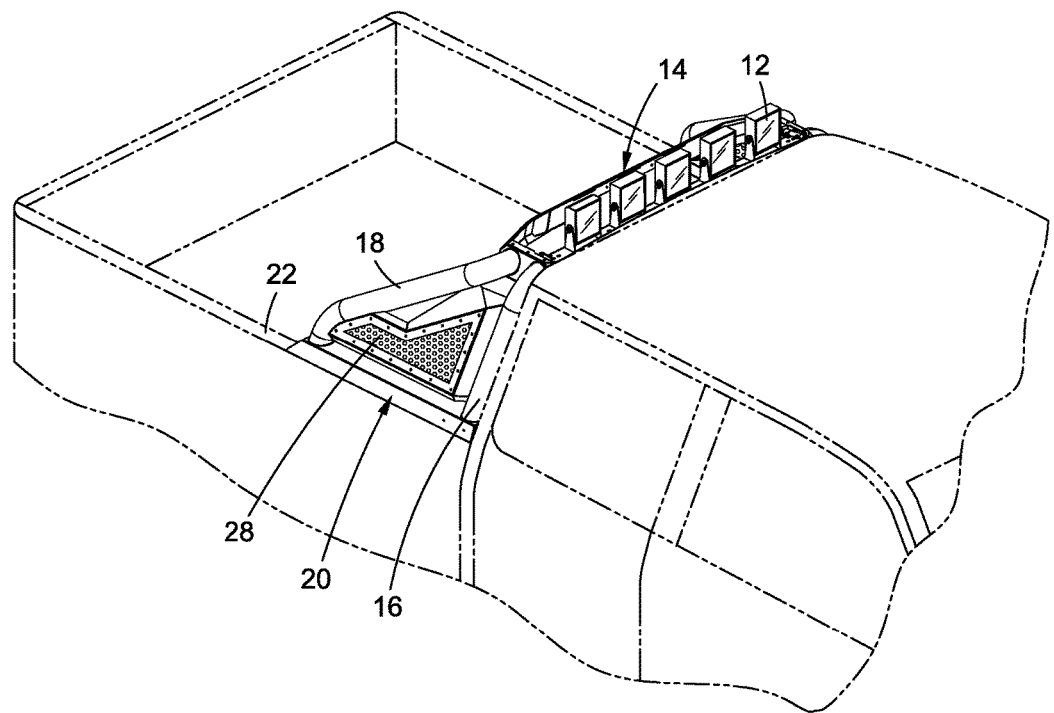
FIG. 7 is a perspective view of the sport bar, mounting tubes and mounting frame connected to the top rail of a pickup box, but with a different decorative panel.

As seen in FIGS. 6-8, the appearance of the side panel 28 may vary. FIGS. 1-6 show a side panel with uniformly spaced rows and columns of smaller holes, while FIG. 7 shows larger holes. The orientation of the rows and columns of openings through the side panel 28 may vary, resulting in various visual appearances. Thus, while uniform arrangements of holes are preferred, other arrangements are believed suitable, with the preferred shapes being circles, squares, diamonds, triangles either cut, punched or otherwise formed through the panel material. A mesh material may also be used. The hole shapes are preferably uniform, but could alternate and be varied row, alternate and be varied by column, or could be any combination of shapes. It is believed desirable to have the openings small enough that a person's fingers do not readily pass through the holes in the side panel 28, with openings of ¼ to ⅜ inch believed suitable. Advantageously, the side panel 28 has a plurality of openings as shown to allow passage of air, but the panel 28 may form a continuous and uniform surface with no unfilled holes through it.

While one side panel 28 and mounting method and mechanism are described, the panels 28 are preferably used on opposing sides of the vehicle. There is also provided a method of attaching a side panel to a sport bar of a motor vehicle. The method includes removably fastening a side panel to a mounting frame where the side panel is sized to fit between the front and rear mounting tubes when moved along a lateral line extending perpendicular to the plane through the centerlines of mounting tubes 16, 18. The side panel has a peripheral shape with a planar mounting surface and a first plurality of holes through the side panel. The installer aligns a first plurality of holes 95b with a second plurality of holes 95b in a planar flange of a mounting frame and places different ones of a first plurality of fasteners 95c through those aligned holes to connect the side panel to the mounting planar flange and mounting frame. The mounting frame has a plurality of mounting plates 71-76 extending from a periphery of the planar flange 46 to one side of the planar flange. A third plurality holes 92b in a periphery of the mounting plates are aligned with a fourth plurality of holes 92a in the front and rear mounting tubes and placing different ones of a second plurality of fasteners 93c through those aligned holes to connect the support plates or mounting plates to the mounting tubes 16, 18. The front and rear mounting tubes advantageously have centerlines in the same plane and the side panel 28 is located on an outer side of that plane while the fourth plurality of holes 92a in the mounting tubes are located on an inner side of that plane. The mounting frame 26 with the flange 46 and connecting plates 70-76, preferably does not pass through the space between the mounting tubes 16, 18, when moved along a lateral line. That allows the periphery of the mounting plates to abut the inner side of the mounting tubes 16, 18 to provide an abutting connection of the parts when the fasteners 92c are tightened. The side panel 28 may be fastened to the frame 26 before or after the frame 26 is fastened to the mounting tubes.

The side panel 28 and mounting support 26 are preferably made of metal, more preferably of steel or aluminum. But sufficiently sturdy plastic parts may be used.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein.

What is claimed is:

1. A sport bar for a motor vehicle having a generally vertical front mounting tube and having a rear mounting tube inclined in a downward and rearward direction relative to the front mounting tube, the mounting tubes connected by a mounting base configured to fasten to the upper rail of the bed of a pickup truck, the sport bar comprising:
    a removable side panel sized to fit between the front and rear mounting tubes, the side panel having a peripheral shape with a planar mounting surface and a first plurality of holes through the side panel;

a mounting frame having a mounting panel flange having a planar surface configured to mate with the peripheral shape of the side panel and having a second plurality of holes located to correspond with the first plurality of holes through the side panel, the mounting frame having a periphery from which extend a plurality of mounting plates inclined to one side of the mounting panel flange, a plurality of the mounting plates having a side connected to a side of another mounting plate, the plurality of mounting plates having a third plurality of holes at a periphery of the mounting plates which third plurality of holes are located to coincide with a mating fourth plurality of holes on the mounting tube; and a plurality of fasteners extending through the first plurality of holes in the side panel and the second plurality of holes in the mounting panel flange to releasably fasten the side panel to the mounting frame, and a second plurality of fasteners extending through the third plurality of holes in the mounting plates and fourth plurality of holes in the mounting tubes to fasten the mounting frame to the mounting tubes.

2. The sport bar of claim 1, further comprising a bracket connected to one of the sport bars and further connected to the mounting tube.

3. The sport bar of claim 2, wherein the bracket comprises a plate having one end fastened by a fastener to the rear mounting tube and another end fastened by a fastener to one of the mounting plates.

4. The sport bar of claim 1, wherein the side panel has a peripheral flange through which the first plurality of holes extend.

5. The sport bar of claim 4, wherein the mounting tubes have a diameter D and are located so that centerlines of the mounting tubes are in a common plane and the side panel is located outward of that common plane a distance of about D/2.

6. The sport bar of claim 4, wherein the side panel has a straight bottom side and a straight front side.

7. The sport bar of claim 6, wherein the side panel has a third side joining the bottom side and front side, the third side having two inclined segments and an intervening horizontal segment.

8. The sport bar of claim 7 wherein the mounting tubes have a diameter D and are located so that centerlines of the mounting tubes are in a common plane and the side panel is located outward of that common plane a distance of about D/2.

9. The sport bar of claim 6, wherein the mounting plates include a bottom plate that extends along the straight bottom side and is longer than it is wide and not fastened to the mounting tubes.

10. The sport bar of claim 9, wherein the mounting plates include a front plate having an inclined bottom portion connected to one end of the bottom plate, the front plate having a generally rectangular shape.

11. The sport bar of claim 10, wherein the mounting plates include a first inclined plate extending along the first inclined segment, and further comprising a triangular plate having one side joined to a top of the front plate and a second side joined to a top of the first inclined plate.

12. The light bar of claim 11, further including the front and rear sport bars to provide a front and rear tube on each opposing side of the motor vehicle during use.

13. The light bar of claim 11, wherein the removable side panel and mounting frame of claim 1 is fastened to a first side of the sport bars and further comprising a second side panel and mounting frame of claim 1 fastened to a second side of the sport bars.

* * * * *